US012650555B2

(12) United States Patent
Marta et al.

(10) Patent No.: US 12,650,555 B2
(45) Date of Patent: Jun. 9, 2026

(54) HOLLOW CORE FIBER WITH PASSIVATION PROTECTED ENDS

(71) Applicant: Honeywell International Inc., Charlotte, NC (US)

(72) Inventors: Teresa Marta, White Bear Lake, MN (US); Karl D. Nelson, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 850 days.

(21) Appl. No.: 17/879,996

(22) Filed: Aug. 3, 2022

(65) Prior Publication Data

US 2024/0402416 A1     Dec. 5, 2024

(51) Int. Cl.
    *G02B 6/02*      (2006.01)
    *G02B 6/036*     (2006.01)
    *G02B 6/44*      (2006.01)

(52) U.S. Cl.
    CPC ......... *G02B 6/02304* (2013.01); *G02B 6/036* (2013.01); *G02B 6/443* (2013.01)

(58) Field of Classification Search
    CPC .... G02B 6/02304; G02B 6/036; G02B 6/443; G02B 6/02328; G02B 6/032; G02B 6/25
    See application file for complete search history.

(56) References Cited

U.S. PATENT DOCUMENTS

| | | |
|---|---|---|
| 5,440,664 A | 8/1995 | Harrington et al. |
| 6,620,300 B2 | 9/2003 | Singh et al. |
| 7,245,807 B2 | 7/2007 | Mangan et al. |
| 7,266,276 B2 | 9/2007 | Majid et al. |
| 8,253,945 B2 | 8/2012 | Gahan et al. |
| 10,527,782 B2 | 1/2020 | Lyngsøe et al. |
| 11,215,751 B2 * | 1/2022 | Poletti ................... G02B 6/024 |
| 2008/0141724 A1 | 6/2008 | Fuflyigin |
| 2010/0266251 A1 | 10/2010 | Lyngsoe et al. |
| 2021/0154624 A1 | 5/2021 | Oh et al. |
| 2021/0387892 A1 | 12/2021 | Van Leeuwen et al. |

FOREIGN PATENT DOCUMENTS

| | | |
|---|---|---|
| CN | 110673256 A | 1/2020 |
| EP | 3306685 B1 | 8/2020 |
| WO | 2022028812 A1 | 2/2022 |

OTHER PUBLICATIONS

Lau et al., Recent progress and prospects of polymeric hollow fiber membranes for gas application, water vapor separation and particulate matter removal, Journal of Materials Chemistry A, Accepted Sep. 30, 2021, pp. 26454 through 26497, (c) The Royal Society of Chemistry 2021.

(Continued)

*Primary Examiner* — John Bedtelyon
(74) *Attorney, Agent, or Firm* — Fogg & Powers LLC

(57)     ABSTRACT

A hollow core fiber is provided. The hollow core fiber includes at least one cleaved fiber end-face and a dielectric coating. The dielectric coating is formed by a passivation layer of dielectric that is applied to the at least one cleaved fiber end-face such that a portion of an interior surface that defines a hollow core of the hollow core fiber adjacent to the at least one cleaved fiber end-face is coated with the dielectric coating.

13 Claims, 4 Drawing Sheets

(56) References Cited

OTHER PUBLICATIONS

Rikimi et al., "Growth of Ammonium Chloride on Cleaved End-Facets of Hollow Core Fibers", downloaded Jan. 28, 2022 from IEEE Xplore, pp. 1 through 2, CLEO 2020 (c) OSA 2020.

SilcoTek Corporation, "SilcoTek Coatings, Inert, Corrosion Resistant, Anti-Coking Solutions" downloaded Apr. 1, 2022 from https://www.silcotek.com, pp. 1 through 7.

European Patent Office, "Extended European Search Report", from EP Application No. 23175296.5, from Foreign Counterpart to U.S. Appl. No. 17/879,996, filed Dec. 20, 2023, pp. 1 through 10, Published: EP.

Matsuura et al., "Hollow glass waveguides with three-layer dielectric coating fabricated by chemical vapor deposition", Journal of the Optical Society of America A, vol. 14, No. 6, Jun. 1997, pp. 1255 through 1259.

Matsuura et al., "Infrared hollow glass waveguides fabricated by chemical vapor deposition", Optics Letters, vol. 20, No. 20, Oct. 15, 1995, pp. 2078 through 2080.

* cited by examiner

HOLLOW CORE FIBER WITH PASSIVATION PROTECTED ENDS

This invention was made with Government support under FA9453-20-C-0013 awarded by Air Force Research Laboratory. The Government has certain rights in the invention.

BACKGROUND

Fiber optic cables are used to transmit information via light signals. A fiber optic cable typically contains a plurality of core fibers formed from glass or plastic. A glass layer, called a cladding, and a jacket layer typically acts as protective layers for each individual core fiber. The fiber core conveys the light signals which are interfaced into an end-face of each fiber core. The light signal(s) are transmitted within the fiber core due to the different refractive indices at the interface of the fiber core and the cladding using the principal of total internal reflection A hollow core fiber is a type of core fiber which guides light signals within a hollow core region. The light signals are confined to the hollow core by hollow tunnels surrounded by a solid fiber material such as glass. In this design, the light is contained within the hollow core due to total internal reflection due to the different refractive indices between the air and glass wall interface therein providing an increase in speed and a lower signal loss over longer distances compared to other traditional core fiber designs.

A fiber end of a hollow core fiber, called cleaved fiber end-facet or cleaved fiber end-face, is typically exposed to air. In a hollow core fiber that is made from silicon glass containing high chlorine, the exposure to air can cause the cleaved fiber end-face to become contaminated due to exposure to humidity and other elements in the air. The contamination can form microstructures of residual chlorine salts from the manufacturing process that result in a detrimental change in optical properties/coupling efficiency over time. Contamination may occur in as little as one week. The use of high chlorine and other compounds tend to help add desirable properties in the manufacture of hollow core fiber.

For the reasons stated above and for other reasons stated below which will become apparent to those skilled in the art upon reading and understanding the present specification, there is a need in the art for a way to prevent contamination of cleaved end-facet ends of a hollow core fiber.

SUMMARY

The following summary is made by way of example and not by way of limitation. It is merely provided to aid the reader in understanding some of the aspects of the subject matter described. Embodiments provide a hollow core fiber with cleaved fiber end-faces that are covered in an inert dielectric layer.

In one embodiment, a hollow core fiber with passivation layer is provided. The hollow core fiber includes at least one cleaved fiber end-face; and a dielectric coating. The dielectric coating is formed by a passivation layer of dielectric that is applied to the at least one cleaved fiber end-face such that a portion of an interior surface that defines a hollow core of the hollow core fiber adjacent to the at least one cleaved fiber end-face is coated with the dielectric coating.

In another embodiment, a hollow core fiber with passivation layer including a hollow core fiber with at least one cleaved fiber end-face is provided. A dielectric coating is formed with a passivation layer of dielectric that is applied to the at least one cleaved fiber end-face with a chemical vapor deposition system such that a portion of an interior surface that defines a hollow core of the hollow core fiber adjacent to the at least one cleaved fiber end-face is coated with the dielectric coating. Wherein a depth of the portion of the interior surface that defines the hollow core of the hollow core fiber that is adjacent to the at least one cleaved fiber end-face with the dielectric coating is a depth in which air can diffuse within the hollow core.

In still another embodiment, a method of forming a passivation layer on a cleaved fiber end-face of a hollow core fiber is provided. The method includes placing at least one cleaved fiber end-face of a hollow core fiber in a chemical vapor deposition chamber; heating material to a thermal decomposition temperature to create a gaseous compound; and directing a flow of the gaseous compound across the at least one cleaved fiber end-face of the hollow core fiber to deposit a passivation layer of dielectric on the at least one cleaved fiber end-face to form a dielectric coating, wherein the dielectric coating extends into a hollow core portion of the hollow core fiber adjacent to the at least one cleaved fiber end-face.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a hollow core fiber with cleaved fiber end-faces that are covered in an inert dielectric layer. The hollow core fiber in embodiments includes a coated portion of an interior surface that defines a hollow core of the hollow core fiber that is adjacent the coated cleaved fiber end-face. In one example, existing passivation techniques are applied by a chemical vapor deposition (CVD) to generate the inert dielectric layer. With passivated cleaved fiber end-faces, a permanent resistance from environmental contamination is provided. This provides for a greater stable performance and coupling efficiency of the hollow core fiber. Further benefits include a hollow core fiber that may be used without any additional treatment needed to remove contamination before use.

Figure 1A:
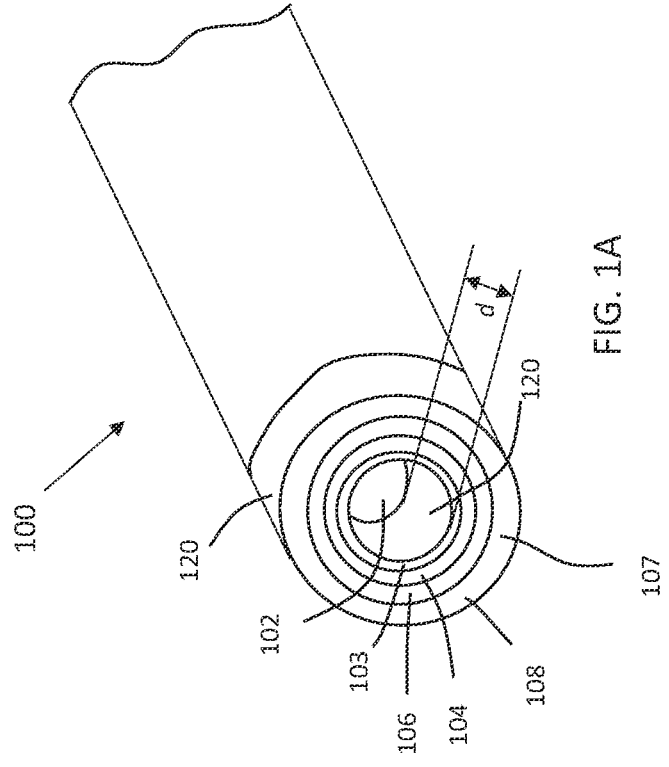
FIG. 1A is an illustration of a partial hollow core fiber including a cleaved fiber end-face with a dielectric coating according to an example aspect of the preset invention.

Referring to FIG. 1A, an example of a partial fiber optical cable is provided. The fiber optical cable is a hollow core fiber 100. This example includes an outer protective cover 108 (or jacket), a glass capillary 106, a reflective interface 104, a dielectric layer 103 and the hollow core 102. An example of a reflective interface 104 is a silver layer, an example of the dielectric layer 103 is a silver-iodine layer, and an example of a protective cover 108 is a polyimide layer. Other types of layers may be used. In embodiments, a coating, such as an inert dielectric coating 120, is formed on each cleaved fiber end-face 107 of the hollow core fiber 100 to passivate the cleaved fiber end-face 107 of the hollow core fiber 100. As illustrated, the dielectric coating 120 extends within the hollow core 102 a certain depth d from the cleaved fiber end-face 107. The depth d may be the distance or depth air reaches (extends) within the hollow core 102 of the hollow core fiber 100. In one example, that depth may be in the range of 500 to 1000 microns.

Figure 1B:
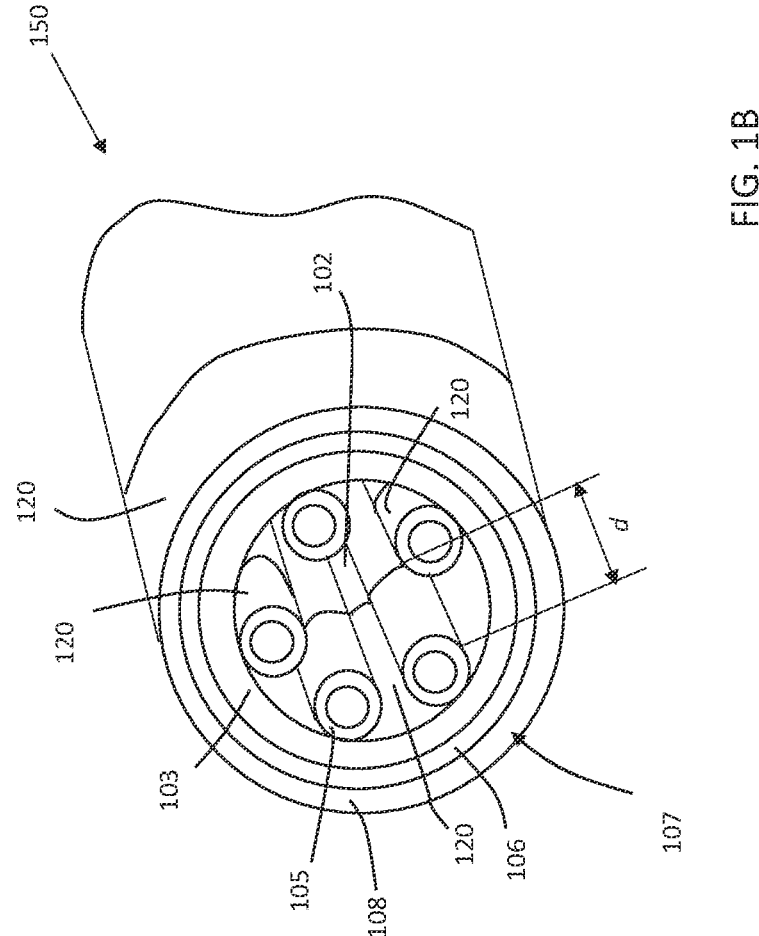
FIG. 1B is a close-up view of a cleaved fiber end-face according to an example aspect of the preset invention.

FIG. 1B illustrates another embodiment of a hollow core fiber 150. In this example, instead of the using a reflective interface, anti-resonant capillary elements 105 are received within the hollow core 102. As illustrated in the close-up view of the fiber end-face 107 of the hollow core fiber 150 of FIG. 1B, the dielectric coating 120 also covers end portions of the capillary elements 105 within the hollow core 102 at a depth d from the cleaved fiber end-face 107. Further, the dielectric coating 120 may be received within an inside surface of the anti-resonant capillary elements 105 in an example.

Figure 2:
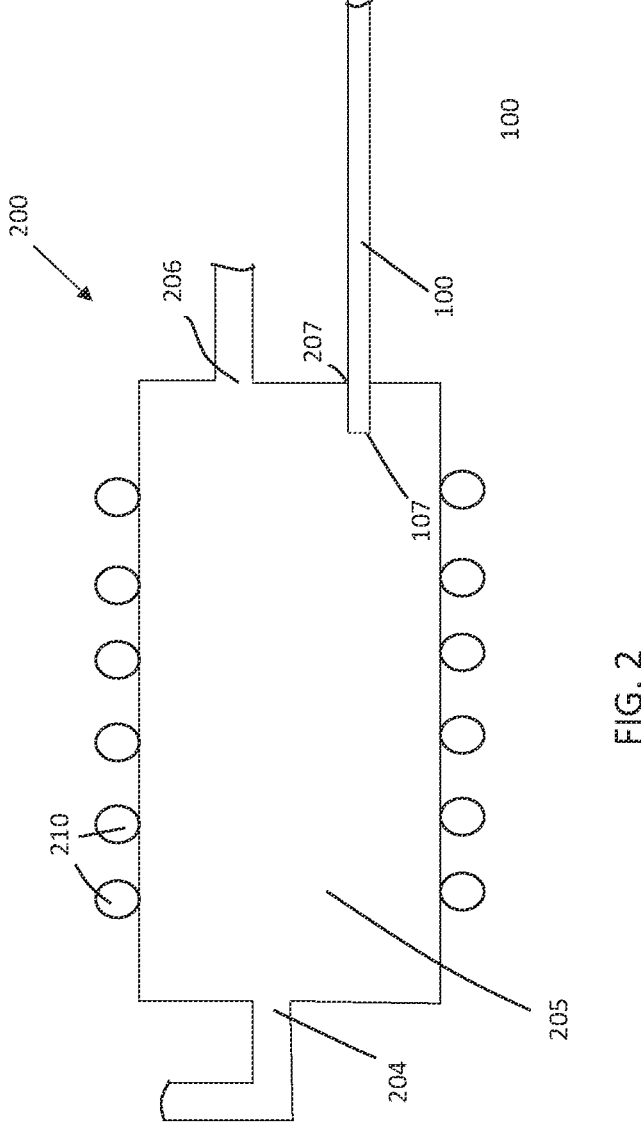
FIG. 2 is a block diagram of a chemical vapor deposition system depositing a dielectric coating on a cleaved fiber end-face according to an example aspect of the present invention.

FIG. 2 illustrates a block diagram of a CVD system 200 used to coat the cleaved fiber end-face 107 of the hollow core fiber 100 to create passivation protected ends in an example. A CVD system 200 is used to produce the dielectric coating 120 by depositing material at a temperature above a thermal decomposition temperature of the material. The CVD system 200 in this example, includes an inlet 204 that allows the gas formed with the material to flow into a chemical vapor deposition chamber 205 and an outlet 206 that lets the gas escape from the reaction chamber 205. A heating system such as a heating coil 210 is used to heat up the chemical vapor deposition chamber 205. The chemical vapor deposition chamber 205, in this example, includes a port 207 that allows a cleaved fiber end-face 107 to be positioned within the chemical vapor deposition chamber 205. A select pressure, a temperature, chemicals (materials) and a duration within the reaction chamber may be used to generate the dielectric coating 120 of a desired thickness on the cleaved fiber end-face 107 of the hollow core fiber 100 and within the inner surface a select depth of the hollow core 102. The thickness of the dielectric coating 120 is a thickness that prevents contamination such as the forming of microstructures of residual chlorine salts on the cleaved fiber end-face 107 and within the hollow core 102 to the depth d. Further in one example, the thickness of the dielectric coating maybe less than half the diameter of an opening to an anti-resonant capillary element 105, in an anti-resonate capillary element example, so the opening to the anti-resonant capillary element 105 does not become plugged.

In an example, the CVD system 200 is set to use a temperature that is above the thermal decomposition temperature of the material to form the gas used in the CVD system 200 while still being below a temperature that would compromise the integrity of the particular outer protective cover 108 (jacket) used in the hollow core fiber 100. Suitable materials to form the dielectric coating 120 include silicon, nitrogen, oxygen etc. In other examples, other material may be used in forming the dielectric coating 120. Further in an example, relatively low pressure, that is close to the standard atmospheric pressure, is used since only the portion of the interior surface of the hollow core 102 that is exposed to air needs to be covered in the coating 120.

Figure 3:
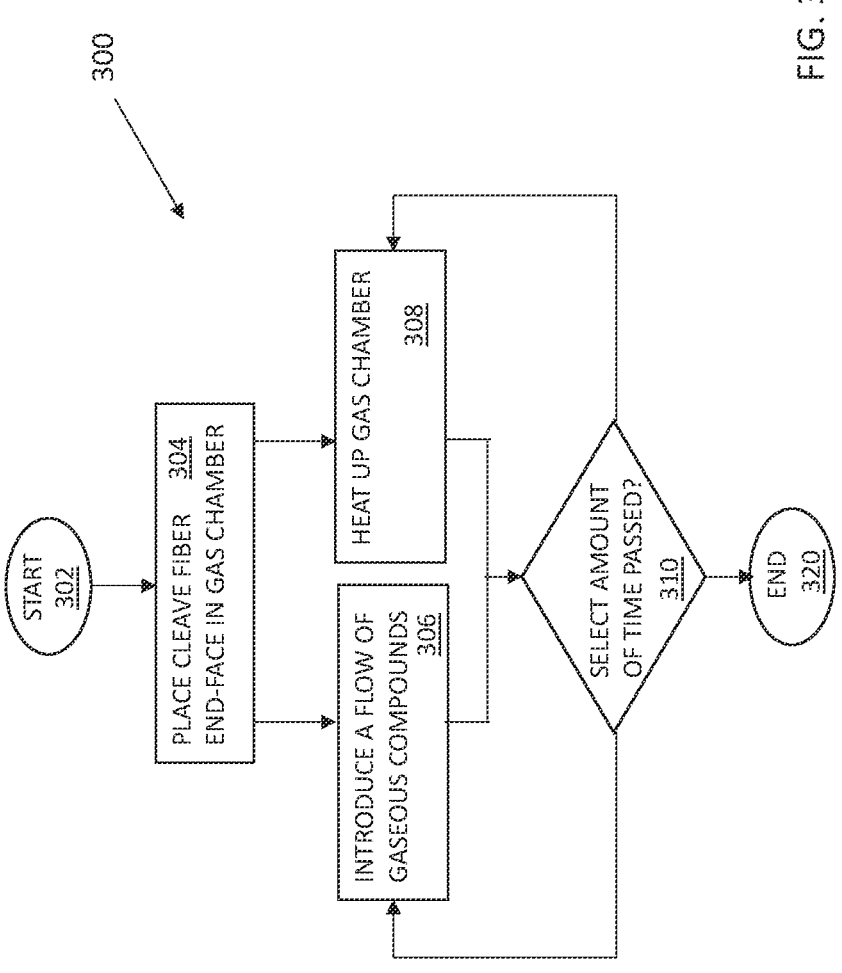
FIG. 3 is a flow diagram describes the formation of the dielectric coating on a cleaved fiber end-face of a hollow core fiber according to an example aspect of the present invention.

FIG. 3 illustrates an example of a flow diagram 300 that describes the formation of the dielectric coating 120 on the cleaved fiber end-face 107. The flow diagram 300 is provided in a series of sequential blocks. The sequence of the blocks may be in a different order, or even in parallel in other embodiments. Hence, embodiments are not limited to the sequence of blocks set out in the flow diagram of FIG. 3.

Flow diagram 300 starts at block 302. At least one cleaved fiber end-face 107 of a hollow core fiber 100 is placed in the chemical vapor deposition chamber 205 of the CVD system 200 at block 304. A flow of gaseous compound of select material is introduced a block 306 and the chemical vapor deposition chamber 205 is heated up at block 308. In an example, the gaseous compound is directed into the chemical vapor deposition chamber 205 through an inlet 204 and out of the reaction chamber through an outlet 206 to create a gaseous compound flow across the fiber end-face 107.

As discussed above, the gaseous compound includes material that is heated to a thermal decomposition temperature of the material. This heating up of the material to form the gaseous compound, may occur before the gas passes through the inlet 204 into the chemical vapor deposition chamber 205. The temperature and pressure within the chemical vapor deposition chamber 205 are set to achieve a desired dielectric coating 120.

At block 310 it is determined if a select amount of time (duration) has passed since the cleaved fiber end-face 107 has been exposed to the gaseous compounds. As discussed above, the desired thickness of the dielectric coating 120 is determined by the materials used in the gaseous compound, the temperature of the chemical vapor deposition chamber 205, the pressure in the chemical vapor deposition chamber 205 and the amount of time (the duration) the cleaved fiber end-face 107 is exposed to the gaseous compounds within the chemical vapor deposition chamber 205.

If it is determined at block 310 that the select amount of time has not passed at block 310, the process continues at blocks 306 and 308 where the gaseous compounds continue to flow, and the gas chamber is continued to be heated. Once the select amount of time has passed, the coating 120 will have covered the cleaved fiber end-face and a portion of the internal surface of the hollow core 102, the process ends at block 320 and the cleaved end-face 107 can be removed from the reaction chamber 205.

EXAMPLE EMBODIMENTS

Example 1 includes a hollow core fiber. The hollow core fiber includes at least one cleaved fiber end-face and a dielectric coating. The dielectric coating is formed by a passivation layer of dielectric that is applied to the at least one cleaved fiber end-face such that a portion of an interior surface that defines a hollow core of the hollow core fiber adjacent to the at least one cleaved fiber end-face is coated with the dielectric coating.

Example 2 includes the hollow core fiber of Example 1, wherein a depth of the portion of the interior surface that defines the hollow core of the hollow core fiber that is adjacent the at least one cleaved fiber end-face with the dielectric coating is at a depth in which air can diffuse within the hollow core through the at least one cleaved fiber end-face.

Example 3 includes the hollow core fiber of any of the Examples 1-2, wherein the dielectric coating is formed with a chemical vapor deposition system.

Example 4 includes the hollow core fiber of Example 3, wherein the chemical vapor deposition system uses a temperature that is below a temperature that is sufficiently low to not compromise an integrity of an outer protective cover of the hollow core fiber in forming the dielectric coating.

Example 5 includes the hollow core fiber of any of the Examples 1-4, further including an outer protective layer, a reflective interface, and a glass capillary positioned between the outer protective layer and the reflective interface.

Example 6 includes the hollow core fiber of any of the Examples 1-5, further including anti-resonant capillary elements formed in the hollow core of the hollow core fiber.

Example 7 includes the hollow core fiber of Example 6, wherein a portion of each anti-resonant capillary element adjacent the at least one cleaved fiber end-face includes the dielectric coating.

Example 8 includes a hollow core fiber including a hollow core fiber having at least one cleaved fiber end-face and a dielectric coating formed with a passivation layer of dielectric applied to the at least one cleaved fiber end-face with a chemical vapor deposition system such that a portion of an interior surface that defines a hollow core of the hollow core fiber adjacent the at least one cleaved fiber end-face is coated with the dielectric coating. Wherein a depth of the portion of the interior surface that defines the hollow core of the hollow core fiber that is adjacent to the at least one cleaved fiber end-face with the dielectric coating is a depth in which air can diffuse within the hollow core.

Example 9 includes the hollow core fiber of Example 8, wherein the depth of the portion of the interior surface that defines the hollow core of the hollow core fiber is within the range of 500 to 1000 microns.

Example 10 includes the hollow core fiber of any of the Examples 8-9, wherein the chemical vapor deposition system uses a temperature that is below a temperature that compromises an integrity of an outer protective cover of the hollow core fiber in forming the dielectric coating.

Example 11 includes the hollow core fiber of any of the Examples 8-10, further including an outer protective layer; a reflective interface; and a glass capillary positioned between the outer protective layer and the reflective interface.

Example 12 includes the hollow core fiber of any of the Examples 8-11, further including anti-resonant capillary elements formed in the hollow core.

Example 13 includes the hollow core fiber of Example 12, wherein a portion of each anti-resonant capillary element includes the dielectric coating adjacent the at least one cleaved fiber end-face.

Example 14 includes a method of forming a passivation layer on a cleaved fiber end-face of a hollow core fiber. The method includes placing at least one cleaved fiber end-face of a hollow core fiber in a chemical vapor deposition chamber; heating material to a thermal decomposition temperature to create a gaseous compound; and directing a flow of the gaseous compound across the at least one cleaved fiber end-face of the hollow core fiber to deposit a passivation layer of dielectric on the at least one cleaved fiber end-face to form a dielectric coating, wherein the dielectric coating extends into a hollow core portion of the hollow core fiber adjacent to the at least one cleaved fiber end-face.

Example 15 includes the method of Example 14, further including removing the at least one cleaved fiber end-face of the hollow core fiber from the chemical vapor deposition chamber once the dielectric coating is of a desired thickness.

Example 16 includes the method of any of the Examples 14-15, wherein a temperature of the chemical vapor deposition chamber is set below a temperature that compromises an integrity of an outer protective layer of the hollow core fiber.

Example 17 includes the method of any of the Examples 14-16, further including setting at least one of a temperature, a pressure, and a duration in the chemical vapor deposition chamber to achieve a desired thickness of the dielectric coating.

Example 18 includes the method of any of the Examples 14-17, further including setting at least one of a temperature, a pressure, and a duration in the chemical vapor deposition chamber to achieve a desired depth of the dielectric coating extending within the hollow core portion of the hollow core fiber adjacent the at least one cleaved fiber end-face.

Example 19 includes the method of any of the Examples 14-18, further including depositing the dielectric coating on anti-resonant capillary elements within the hollow core of the hollow core fiber adjacent the at least one cleaved fiber end-face.

Example 20 includes the method of any of the Examples 14-19, wherein directing the flow of the gaseous compound across the at least one cleaved fiber end-face of the hollow core fiber further includes introducing the flow of gaseous compound through an inlet of the chemical vapor deposition chamber; and exiting the flow of gaseous compound through an outlet of the chemical vapor deposition chamber.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A hollow core fiber comprising:
   at least one cleaved fiber end-face; and
   a dielectric coating formed by a passivation layer of dielectric applied to the at least one cleaved fiber end-face such that a portion of an overall length of an interior surface that defines a hollow core of the hollow core fiber adjacent to the at least one cleaved fiber end-face is coated with the dielectric coating to create a passivation protected end that prevents contamination.

2. The hollow core fiber of claim 1, wherein a depth of the portion of the interior surface that defines the hollow core of the hollow core fiber that is adjacent to the at least one cleaved fiber end-face with the dielectric coating is at a depth in which air can diffuse within the hollow core through the at least one cleaved fiber end-face.

3. The hollow core fiber of claim 1, wherein the dielectric coating is formed with a chemical vapor deposition system.

4. The hollow core fiber of claim 3, wherein the chemical vapor deposition system uses a temperature that is sufficiently low to not compromise an integrity of an outer protective cover of the hollow core fiber in forming the dielectric coating.

5. The hollow core fiber of claim 1, further comprising:

an outer protective layer;

a reflective interface; and a glass capillary positioned between the outer protective layer and the reflective interface.

6. The hollow core fiber of claim 1, further comprising anti-resonant capillary elements formed in the hollow core of the hollow core fiber.

7. The hollow core fiber of claim 6, wherein a portion of each anti-resonant capillary element adjacent the at least one cleaved fiber end-face includes the dielectric coating.

8. A hollow core fiber:

at least one cleaved fiber end-face; and a dielectric coating formed with a passivation layer of dielectric applied to the at least one cleaved fiber end-face with a chemical vapor deposition system such that a portion of an overall length of an interior surface that defines a hollow core of the hollow core fiber adjacent the at least one cleaved fiber end-face is coated with the dielectric coating to create a passivation protected end that prevents contamination, wherein a depth of the portion of the interior surface that defines the hollow core of the hollow core fiber that is adjacent to the at least one cleaved fiber end-face with the dielectric coating is a depth in which air can diffuse within the hollow core.

9. The hollow core fiber of claim 8, wherein the depth of the portion of the interior surface that defines the hollow core of the hollow core fiber is within a range of 500 to 1000 microns.

10. The hollow core fiber of claim 8, wherein the chemical vapor deposition system uses a temperature that is below a temperature that compromises an integrity of an outer protective cover of the hollow core fiber in forming the dielectric coating.

11. The hollow core fiber of claim 8, further comprising:

an outer protective layer;

a reflective interface; and a glass capillary positioned between the outer protective layer and the reflective interface.

12. The hollow core fiber of claim 8, further comprising anti-resonant capillary elements formed in the hollow core.

13. The hollow core fiber of claim 12, wherein a portion of each anti-resonant capillary element includes the dielectric coating adjacent the at least one cleaved fiber end-face.

\* \* \* \* \*